Feb. 24, 1970     W. C. CHOATE     3,496,662
DEVICE HAVING BISTABLE COLOR STATES
Filed April 4, 1968     3 Sheets-Sheet 1

INVENTOR
WILLIAM C. CHOATE

*Jerry W. Mills*

ATTORNEY

Feb. 24, 1970  W. C. CHOATE  3,496,662
DEVICE HAVING BISTABLE COLOR STATES
Filed April 4, 1968  3 Sheets-Sheet 2

INVENTOR
WILLIAM C. CHOATE

ATTORNEY

United States Patent Office 3,496,662
Patented Feb. 24, 1970

3,496,662
DEVICES HAVING BISTABLE COLOR STATES
William C. Choate, Plano, Tex., assignor to Texas Instruments Incorporated, Dallas, Tex., a corporation of Delaware
Filed Apr. 4, 1968, Ser. No. 718,756
Int. Cl. G09f 13/00
U.S. Cl. 40—28
23 Claims

ABSTRACT OF THE DISCLOSURE

Devices are provided which have both thermochromic and electrothermal characteristics. The device is connected to a source of electric voltage of a magnitude such that the device is normally cold and thus has a first color. Upon selective variance of the temperature of the device, the device is changed to a second color due to its thermochromic properties. The resistance of the device is also changed due to its electrothermal properties so that the device is maintained at the second color until the source of voltage is removed. The device is utilized as a building block for memory systems and for passive information display arrays.

---

This invention relates to devices having bistable color states, and more particularly to devices having both thermochromic and electrothermal characteristics to provide bistable color states useful for memory circuits and passive display arrays.

The usefulness of thermochromic materials, or materials which undergo a change of color at some critical temperature, has been known for quite some time. For instance, in U.S. Patent No. 3,323,241 to Blair et al., issued June 6, 1967, the use of thermochromic material for passive information displays is disclosed. The Blair et al. patent discloses arrays of heating elements arranged upon the surface of a substrate, with thermochromic material deposited over the heating elements. Circuitry is provided to selectively energize ones of the heating elements to cause portions of the thermochromic layer to change color to display information. Such passive information displays utilize reflection of light to impart intelligence, and therefore may be advantageously utilized in high light level environments.

Although passive information displays utilizing thermochromic characteristics of materials have been found to provide many advantages over conventional mechanical type displays, previously developed thermochromic displays generally require continuous application of external heat from adjacent heating elements in order to maintain the thermochromic material in an excited condition. This characteristic often necessitates undesirable input power requirements for non-changing information displays, and additionally eliminates the practical use of the thermochromic material as graphic memory devices.

In accordance with the present invention, a device is provided which provides two stable color states without the necessity of a continuous application of external heat. The device comprises material having thermochromic characteristics and additionally having an electrical resistance which varies in dependence upon temperature. A source of voltage is connected across the material and the material is selectively heated to cause a change of color due to the thermochromic characteristics of the material. At the same time, the resistance of the material increases such that the change of color is maintained even after the external source of heat is removed.

In one aspect of the invention, the bistable color states of the device are utilized to display information indefinitely, but also to provide the capability of erasure when desired. In another aspect of the invention, the bistable color states of the device are utilized in graphic memory applications.

For a more complete undestanding of the present invention and for further objects and advantages thereof, reference is now made to the following description taken in conjunction with the accompanying drawings, in which.

The properties of thermochromic materials are disclosed in detail in the previously identified Blair et al. U.S. Patent 3,323,241. Basically, thermochromic material is one which physically changes color at some critical temperature. This change of color with change of temperature is usually attributed either to a color "shift" due to increased absorption of high energy photons, or alternatively to changes in energy absorption caused by alterations in the crystallographic structure of the thermochromic material itself. A number of materials having thermochromic characteristics are available for use with the present invention, many of which are listed and described in detail in the Blair et al. patent. In particular, $Cu_2HgI_4$ which changes from red to black at about 70° C., and $Ag_2HgI_4$ which changes from yellow to brown at about 51° C., may be advantageously utilized in the invention.

The essence of the present invention is the combination of electrothermal properties with thermochromic properties to provide two stable color states. For the purposes of this description, the term electrothermal is defined as the characteristic of having an electrical resistance which varies in a known manner with changes in temperature. While various terms, such as thermistor, are applicated to materials and devices having a temperature sensitive electrical resistance, the term electrothermal will be utilized in the present disclosure to encompass all such materials and devices.

Figure 1:
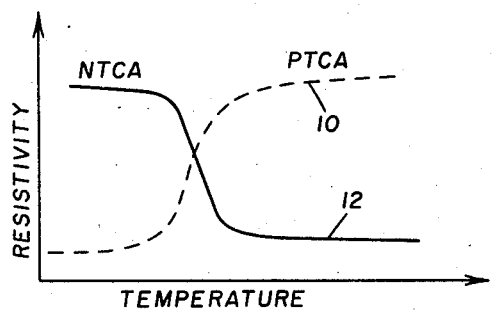
FIGURE 1 illustrates a graphical representation of the resistivity characteristics of two basic types of electrothermal materials.

FIGURE 1 illustrates the resistivity variance of the two basic types of electrothermal materials in response to temperature changes. Positive temperature coefficient anomaly material, termed PTCA material, exhibits a sharp increase in resistivity upon an increase in temperature, as illustrated by the dotted curve 10. Conversely, negative temperature coefficient anomaly material, termed NTCA material, exhibits a substantial reduction in resistivity upon an increase in temperature, as shown by the solid curve 12. The high resistivity values shown in FIGURE 1 for typical materials are about 1000 times the values of the low resistivity values. Both types of electrothermal materials may be advantageously used in various aspects of the invention.

Certain materials which exhibit thermochromic characteristics also exhibit electrothermal characteristics, such as $Cu_2HgI_4$ and $Ag_2HgI_4$ previously described. Thus, devices constructed solely from these materials may be used as bistable color devices in a manner to be later described. Alternatively, a material exhibiting only electrothermal characteristics, such as strontium doped barium titanate or polyethylene impregnated with carbon, both of which exhibit PTCA characteristics, may be thermally coupled to thermochromic material to provide the present bistable color device.

Figure 2:
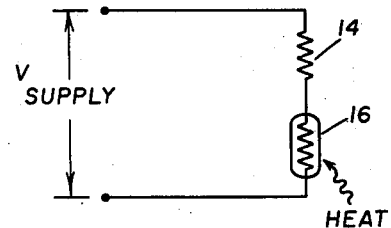
FIGURE 2 is a schematic illustration of an embodiment of the present device.

FIGURE 2 illustrates a schematic of a bistable color circuit which comprises a resistor 14 connected in series with the bistable color device 16 of the invention. A voltage supply is connected across the terminals of the series connected circuit. Device 16 may comprise a layer of $Cu_2HgI_4$ or $Ag_2HgI_4$ deposited on a substrate as disclosed in the Blair et al. patent and provided with suitable electrical contacts, or alternatively may comprise a body of strontium doped barium titanate in thermal contact with a suiable thermochromic material such as $Cu_2HgI_4$ or $Ag_2HgI_4$. In the circuit illustrated, the material having electrothermal characteristics is of the PTCA type. When the device 16 is cold, the device 16 has a first color. Additionally, when cold, the device 16 has a sufficiently low resistance compared to the resistor 14 that the device does not dissipate enough power to heat appreciably.

However, when the device 16 is heated, as by a source of external heat or by momentary internal heat dissipation, the device 16 changes color due to its thermochromic characteristics. For instance, the device 16 may be heated by an adjacent heating resistor, by the focusing of a laser beam thereupon, or by the application of a momentary overvoltage. Additionally, the device 16 increases sharply in electrical resistance due to its electrothermal characteristics. The resistance of the device 16 is now large compared to resistance 14 and the power dissipated by the device 16 is sufficient to maintain the device hot even after the external source of heat has been removed. This condition, termed the self-heating mode of operation, is the basis for the bistable color properties of the device 16.

In order to switch the device 16 back to its unheated color state, the voltage supply is momentarily removed from across the terminals of the resistance 14 and the device 16. The device 16 then cools below its critical temperature and returns to its unexcited color state. Additionally, the electrical resistance of the device 16 falls to a magnitude such that the device remains in the unexcited color state even when the voltage supply is reapplied across the terminals.

Figure 3:
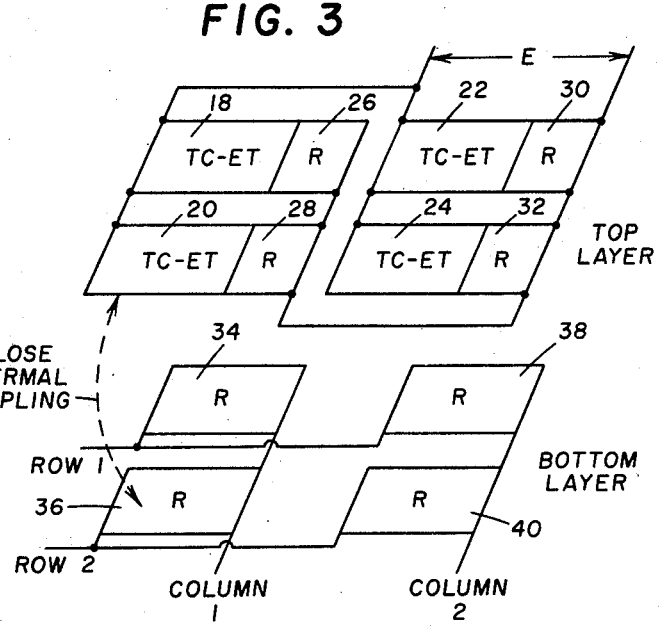
FIGURE 3 is a somewhat diagrammatic representation of a display array utilizing the present device.

FIGURE 3 illustrates the use of the circuit shown in FIGURE 2 as a basic element in a display array. Devices 18, 20, 22 and 24 each have both thermochromic and electrothermal characteristics as previously described, and may comprise either unitary bodies of thermochromic material, or alternatively may comprise a body of strontium doped barium titanate in thermal contact with a body exhibiting only thermochromic characteristics. Resistive members 26, 28, 30 and 32 are in electrical contact with respective ones of the thermochromic-electrothermal devices to form four series connected circuits similar to the schematic shown in FIGURE 2. These four circuits are connected in parallel across a source of voltage E. Each of the devices 18, 20, 22 and 24 is of the PTCA type such that when the devices are in the cold state, the electrical resistances of the devices are sufficiently low that most of the voltage drop of the system occurs across the resistors 26, 28, 30 and 32.

Disposed as a bottom layer directly below the previously described array are four heating resistances 34, 36, 38 and 40. These resistances are electrically insulated from the upper array, but are in close thermal coupling with the upper array. One terminal of each of the heating resistors 34 and 38 is connected by a lead designated Row 1. Similarly, one terminal of each of the heating resistors 36 and 40 are interconnected by a lead to form the designated Row 2. The remaining terminals of heating resistors 34 and 36 are connected by a lead designated Column 1, while the remaining terminals of the heating resistors 38 and 40 are interconnected by a lead designated Column 2.

In operation of the array, if it is desired to change the device 18 from a cold state to a heated state, and thereby vary the color of the device, voltage is supplied across Row 1 and Column 1 in order to heat up the resistor 34. Due to the close thermal coupling of the resistor 34 and the device 18, the device 18 will be heated and will change color due to its thermochromic characteristics. Simultaneously, the resistance of the device 18 will increase due to its electrothermal characteristics. Because of the increased resistance of the device 18, a substantial portion of the voltage E will be dissipated across the device 18, thereby maintaining the device 18 in its helf-heating mode. The voltage applied across Row 1 and Column 1 may thus be removed, thereby allowing resistor 34 to cool, without causing the device 18 to change color.

In order to reset the device 18 to its original unexcited color, the voltage E is removed for an interval long enough to allow the device 18 to cool to its unexcited state. In similar manners, other ones of the heating resistances 36, 38 and 40 may be selectively energized by suitable placement of voltage across the proper Row-Column leads. The selected resistances are then heated in order to raise the selected thermochromic-electrothermal devices 20, 22 and 24 to their excited color states.

It will be understood that the diagrammatic embodiment shown in FIGURE 3 may be advantageously constructed upon a substrate according to the methods disclosed in the Blair et al. patent. For instance, the resistances 34–40 are formed from a suitable material such as tantalum or tin oxide, and deposited on the substrate by conventional techniques such as sputtering or evaporating the material through a mask. Evaporated metal leads then form the designated row and column connections. A layer of electrical insulating material is then disposed over the formed resistors, and a layer of thermochromic material is deposited upon the insulating material so as to be in close thermal coupling with the heating resistors.

The thermochromic-electrothermal material may be deposited directly by sublimation, or the material may be pulverized and mixed with a binder for application. Resistors 26, 28, 30 and 32 formed from a suitable material such as tantalum or tin oxide are then deposited in electrical contact with the thermochromic material. Evaporated metal leads are then applied to connect the upper array as illustrated.

Figure 4:
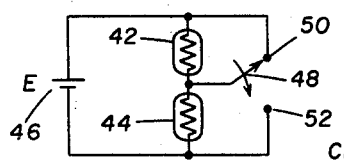
FIGURE 4 is a schematic diagram of a circuit utilizing two of the present bistable devices.

FIGURE 4 illustrates a circuit utilizing a pair of the present thermochromic-electrothermal devices 42 and 44 connected in a series with a source of voltage 46. Devices 42 and 44 are identical and are constructed from PTCA material. A switch arm 48 is movable between switch terminals 50 and 52. In the illustrated position of the switch arm 48 in contact with the terminal 50, the device 42 is electrically shorted and the full voltage E is applied across the device 44. Accordingly, device 44 has a high resistance and is held in its excited self-heating mode by voltage E even if the shorted condition on device 42 is removed. In this condition, the high resistance of device 44 limits the current to device 42, preventing it from heating. Device 42 thus is in its cold mode and device 44 is in its heated mode, and the colors of devices 42 and 44 are different.

In order to change the colors of the devices, the switch arm 48 is moved momentarily to terminal 52 to electrically short the device 44 and to impress the voltage E across the device 42. The device 44 will cool and change color due to the lack of current flow therethrough. The device 42 will heat to its self-excited mode and change color. The colors of the devices 42 and 44 will remain until the switch arm 48 is again closed on the terminal 50. The circuit shown in FIGURE 4 may be used either as a passive information display, or as a bistable graphic memory device.

Figure 5:
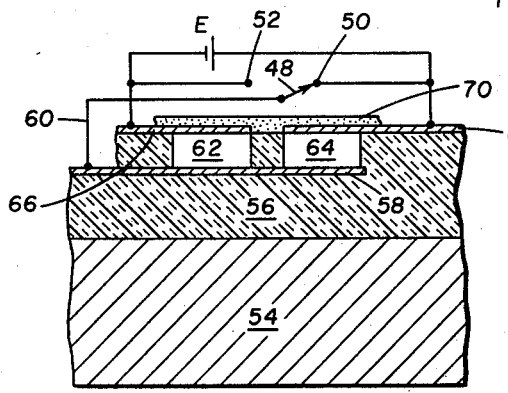
FIGURE 5 is a cross section of a circuit constructed on a substrate according to the schematic shown in FIGURE 4.

FIGURE 5 illustrates a sectional view of a physical construction of the circuit shown in FIGURE 4. The circuit is constructed upon an aluminum heat sink 54, which may be, for instance, ¼" thick. A layer of glass bead filled epoxy 56 is spread over the top of the heat sink 54 at a thickness of several millimeters. A metallized contact strip 58 is disposed on the epoxy and a lead 60 connects with the switch arm 48. A pair of electrothermal bodies 62 and 64 are disposed in electrical contact with the contact strip 58. Electrothermal bodies 62 and 64 are electrically insulated from one another by glass bead filled epoxy 56. A metallized contact strip 66 is disposed over the electrothermal body 62 and connects with the switch terminal 52 and a terminal of the voltage source E. Similarly, a metallized contact strip 68 is disposed over the electrothermal body 64 and connects with the switch terminal 50 and the other terminal of the voltage source E. A layer of thermochromic material 70 is spread in thermal contact with the tops of the electrothermal bodies 62 and 64.

In a preferred embodiment of the device circuit shown in FIGURE 5, the electrothermal devices 62 and 64 are constructed from PTCA strontium doped barium titanate. The thermochromic layer 70 is made from either $Cu_2HgI_4$ or $Ag_2HgI_4$ which is powdered, mixed with an acrylic binder and applied over the top of the electrothermal bodies 62 and 64 as a paint.

The structure shown in FIGURE 5 operates in the same manner as the circuit shown in FIGURE 4. In the illustrated position of the switch arm 48, the electrothermal body 64 has a low resistance and is cold. The portion of the thermochromic layer 70 directly above the body 64 is therefore cold and is in its unexcited color state. However, in the illustrated position of the switch arm 48, the electrothermal body 62 has a high resistance and heats the thermochromic layer directly above it to its excited color state. When the switch arm 48 is momentarily closed on terminal 52, the colors of the thermochromic layer above each of the bodies 62 and 64 changes in the manner previously described.

Figure 6:
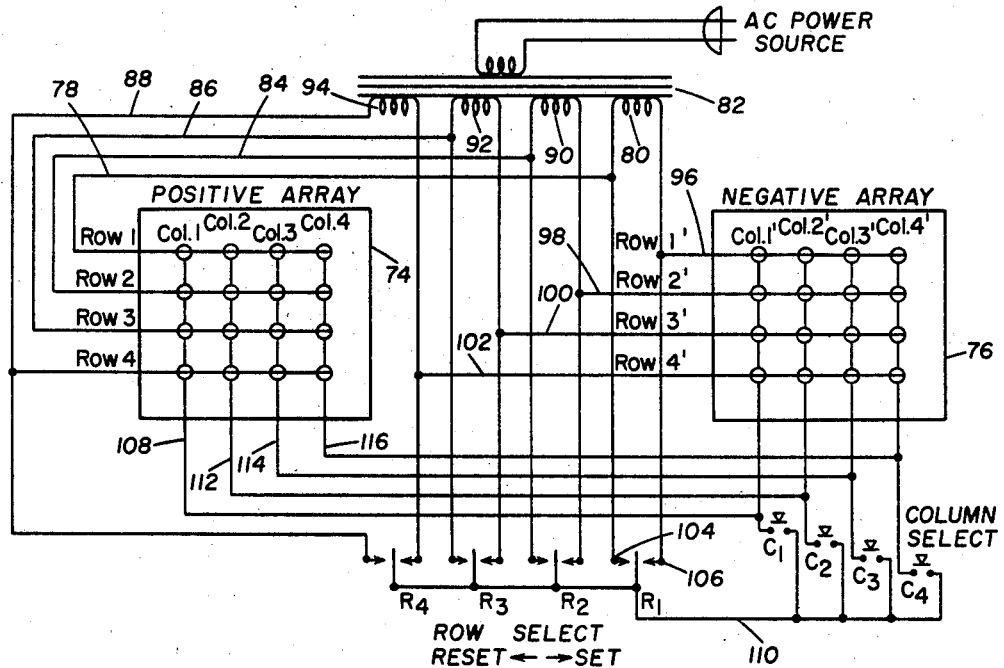
FIGURE 6 is a schematic representation of a display array constructed from a plurality of the circuits shown in FIGURES 4 and 5.

FIGURE 6 illustrates display arrays utilizing a plurality of the present thermochromic-electrothermal devices. An array designated generally by 74 contains sixteen thermochromic-electrothermal devices arranged in Rows 1–4 and in Columns 1–4. An array designated generally by the numeral 76 also includes sixteen thermochromic-electrothermal devices arranged in Rows 1'–4' and Columns 1'–4'. Each of these thermochromic-electrothermal devices are of the PTCA type and are fabricated in a similar manner as the structure shown in FIGURE 5. Array 74 always displays the opposite information displayed on array 76. Therefore, the arrays find use in environments where it is desirable to have a monitor device illustrating the display of a remote array.

The arrays are preferably constructed upon a substrate. A metallized contact connects the upper terminals of all four of the thermochromic-electrothermal devices in Row 1. This metallized contact is connected via lead 78 to a secondary 80 of a transformer 82. The primary of the transformer 82 is connected to a suitable low voltage AC power source. Similarly, the thermochromic-electrothermal devices in Rows 2–4 are connected at like upper terminals by metallized contacts. These metallized contacts are respectively connected via leads 84–88 to transformer secondaries 90–94.

In the negative array 76, like upper terminals of each of the four thermochromic-electrothermal devices in Row 1' are connected by a metallized contact which is connected via a lead 96 to the transformer secondary 80. Similarly, like upper terminals of the thermochromic-electrothermal devices located in each of the Rows 2'–4' are respectively connected via leads 98–102 to the transformer secondaries 90–94.

Additionally, the transformer secondary 80 is connected across the switch terminals 104 and 106 of a Row Select Switch $R_1$. Similarly, the transformer secondaries 90–94 are connected across respective terminals of Row Select switches $R_2$–$R_4$. The switch arms of switches $R_1$–$R_4$ are normally in the illustrated no-contact position.

The lower terminals of each of the thermochromic-electrothermal devices in Column 1 on the positive array 74 are interconnected by a metallized contact strip and connected via a lead 108 to one terminal of a Column Select pushbutton switch $C_1$. The other terminal of the switch $C_1$ is connected to a lead 110 which interconnects each of the switch arms of the Row Select switches $R_1$–$R_4$. Similarly, each of the thermochromic-electrothermal devices contained in Columns 2–4 have their lower terminals interconnected by metallized contact strips which are respectively connected via leads 112–116 to terminals of the Column Select switches $C_2$–$C_4$. The lower terminals of each of the thermochromic-electrothermal devices in Columns 1'–4' in the negative array 76 are also respectively connected to terminals of the Column Select switches $C_1$–$C_4$.

In essence, the system shown in FIGURE 6 comprises a matrix of device pairs connected essentially in the manner shown in FIGURE 4. When a device in a particular Row-Column position in the positive array 74 is in one color state, the corresponding element in the same position on the negative array 76 is in the opposite color state. The color states of each of the devices in both the positive array 74 and the negative array 76 may be selectively set by manipulation of the Row Select switches $R_1$–$R_4$ and the Column Select switches $C_1$–$C_4$. Row Select switches $R_1$–$R_4$ may be operated in either the Reset or Set directions.

For instance, to set the thermochromic-electrothermal device occupying the position at the intersection of Row 1 and Column 1 in the positive array 74 to the excited color state, $R_1$ is moved in the set direction against the switch contact 106, and the Column Select switch $C_1$ is depressed. The device occupying the Row 1-Column 1 position is then connected across the AC power source and is placed in the self-heating mode in the manner previously described. Simultaneously, the device occupying the position of Row 1'-Column 1' in the negative array 76 is shorted, and is thus maintained in the cold color state.

If it is desired to reverse the color states of these two particular devices, the switch arm of the Row Select $R_1$ is merely moved in the reset direction against the switch contact 104. The particular element in the positive array 74 is then shorted and returned to the cold color state, while the particular device in the negative array 76 is placed across the AC power source and placed in the self-heating color mode. In a similar manner, each and every device in the arrays 74 and 76 may be selectively varied in color.

Broadly, to place in the excited color state an element in the $I^{th}$ row and $J^{th}$ column of the positive array 74, the Row Select switch $R_I$ is moved in the set direction and the Column Select switch button $C_J$ is depressed. Alternatively, to reset an element in the positive array 74 to the cold color state, the same procedure is followed except that the Row Select switch $R_I$ is moved in the reset direction. Of course, it will be realized that setting an element in the positive array 74 is equivalent to resetting the corresponding element in the negative array 76.

Figure 7:
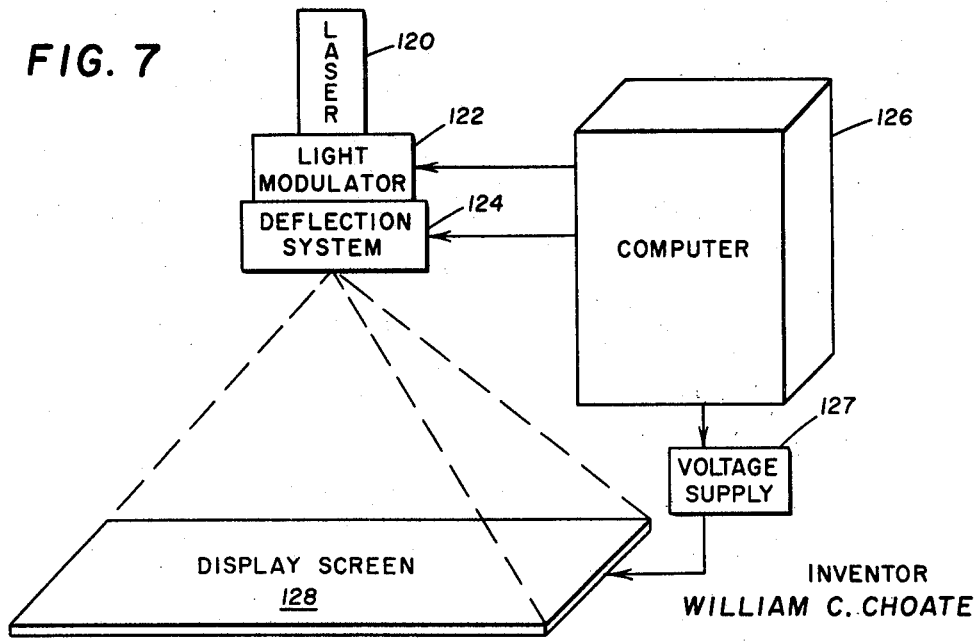
FIGURE 7 is a diagrammatical illustration of a passive display system according to the invention utilizing a laser as an external heat source.
Figure 8:
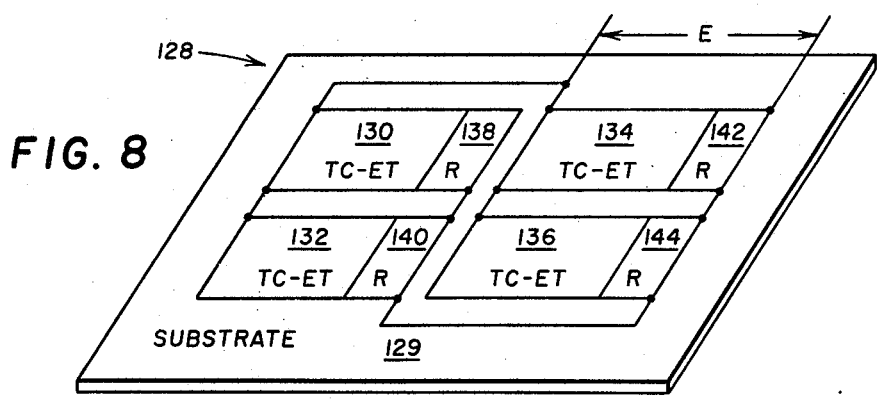
FIGURE 8 is a diagrammatic illustration of a portion of the display screen shown in FIGURE 7.

FIGURES 7 and 8 illustrate another embodiment of the present invention which utilizes a laser beam as an external heating source. As shown in FIGURE 7, a conventional laser 120 provides a coherent light beam which is modulated in intensity by a light modulator 122. The direction of the laser beam if controlled by a conventional deflectional system 124, which may comprise for instance magnetic coils which physically move the laser source, or alternatively may comprise a reflection system for deflecting the laser beam. The operation of the light modulator 122 is controlled from a computer 126 in order that the laser beam can be modulated by video information programmed into the computer. The computer 126 also controls the deflection system 124 in order to move the laser beam to form a rastor on a display screen 128. The output of a voltage supply 127 is also controlled by the computer 126.

The display screen 128 comprises a matrix of thermochromic-electrothermal devices connected as shown in FIGURE 8. This array is similar to the top layer array shown in FIGURE 3, and comprises a substrate 129 containing four thermochromic-electrothermal devices 130, 132, 134 and 136. Additionally, resistances 138, 140, 142 and 144 are deposited on the substrate 129 in electrical contact with respective ones of the devices 130–136. The thermochromic-electrothermal devices 130–136 and their associated resistances are connected in parallel across the source of voltage E. Of course, a practical matrix would comprise a large number of thermochromic-electrothermal devices connected in this manner.

When the light beam from the laser 120 is directed upon a particular thermochromic-electrothermal device, that device is placed in the self-heating mode and exhibits a corresponding color change. In the manner previously described, this color change remains until the source of voltage E from the supply 127 is removed.

By controlling with the computer 126 the light modulator 122, the deflection system 124 and the voltage supply 127 in a coordinated manner, information may be selectively displayed upon screen 128. Several advantages result from the use of this system, as the display on the screen requires regeneration only when changes are required in the display. Further, the laser's output is not required to be in the visible range, and thus relatively low energy is required for the operation of the laser. The duty cycle of the laser is low, as the laser beam is not required to remain upon a particular element once the element is placed in the self-heating mode. As each of the elements on the display screen are either placed in the self-heating mode or in the cold mode, the light modulator 122 is required to operate only in a binary fashion, that is, either zero or maximum transmittance, thereby resulting in simplicity of operation.

Temperature sensitive devices, such as sensors, may be placed behind each of the elements on the array shown in FIGURE 8, in order to detect which elements are in the excited color mode. The electrical outputs of these sensors thus provide electrical indications of the graphic memory of the array. Similar use of such sensors could also be made in other arrays disclosed in this disclosure. Alternately, provision may be made to monitor the voltage across the PTCA elements, a relatively high voltage being indicative that a particular element is in the excited mode.

Figure 9:
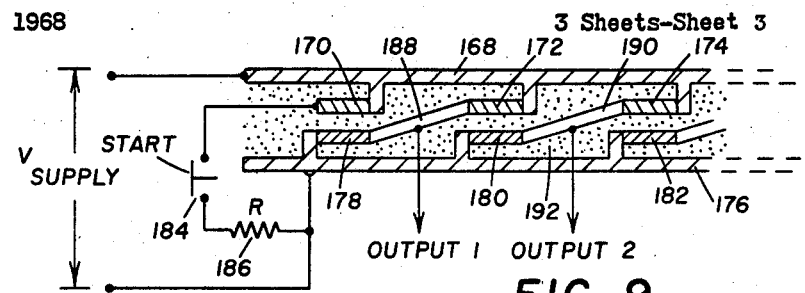
FIGURE 9 illustrates a somewhat diagrammatic sectional view of a physical embodiment of an astable shift register constructed in accordance with the invention.
Figure 10:
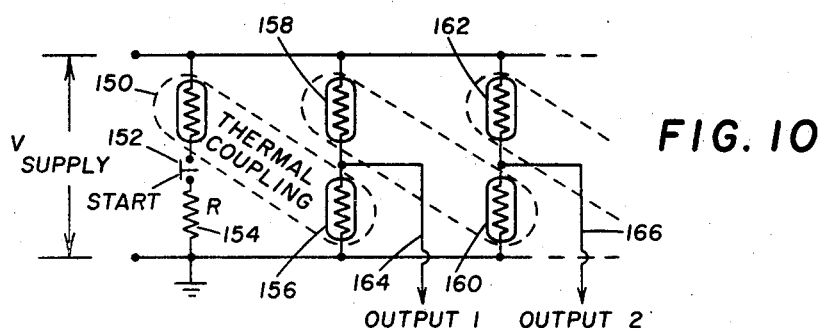
FIGURE 10 illustrates a schematic diagram of the astable shift register shown in FIGURE 9.

FIGURES 9 and 10 illustrate an astable shift register utilizing the present thermochromic-electrothermal devices. The output from such a shift register could be advantageously used to scan columns in an array such as shown in FIGURES 3 and 6. FIGURE 10 is a circuit schematic of the register, while FIGURE 9 is a somewhat diagrammatic cross-sectional view of a physical fabrication of the register. Referring to FIGURE 10, a PTCA thermochromic-electrothermal device 150 is connected to the other terminal of a push button switch 152. A resistor 154 is connected to the other terminal of the switch 152. A voltage supply is applied across the terminals of the device 150 and the resistor 154. Device 150 is in close thermal coupling with a thermochromic-electrothermal device 156 which is constructed from NTCA type material which may comprise for instance zirconium oxide. A thermochromic-electrothermal device 158 is constructed from PTCA material and is connected in series with the device 156.

The device 158 is in close thermal coupling with a thermochromic-electrothermal device 160 constructed from NTCA material. Device 160 is connected in series with a thermochromic-electrothermal device 162 which is constructed from PTCA material. Other stages of the register are constructed in a similar manner to provide the required number of register outputs. The lead 164 is connected between the devices 158 and 156 to provide a first output, and a lead 166 is connected between the devices 160 and 162 to provide a second delayed output.

In operation, each of the devices 150–162 are cold. The devices 150, 158 and 162 thus have relatively low resistances, while the devices 156 and 160 have high resistances. Relatively high voltages are then normally applied on output leads 164 and 166.

Upon the depression of the start button switch 152, the PTCA device 150 is placed in the self-heated mode and couples heat through the thermal coupling to the NTCA device 156. When the device 156 becomes heated past its critical temperature, the resistance of the device substantially drops. The resulting increase in voltage across the PTCA device 158 heats the device 158 to its self-heated mode, thereby causing a color change. The resulting increase in resistance of the device 158 and decrease in resistance of device 156 causes a sharp reduction of the voltage appearing on the output lead 164. Additionally, the thermal coupling between the device 158 and the NTCA device 160 causes a lowering of the resistance of the device 160, and a consequent raising of the device 162 to its self-heating mode. Thus, the voltage appearing upon the lead 166 is substantially reduced.

Meanwhile, the start button 152 has been released and the NTCA device 156 cools back to its higher resistance stage, which causes a reduction in the current through PTCA device 158. Device 158 cools, thereby causing cooling of the device 160, which causes cooling of device 162. Thus, it will be seen that the present circuit provides a series of negative going register output pulses, the rate of repetition of which may be controlled by varying the thermal coupling between the thermochromic-electrothermal devices, the magnitude of the voltage supply, and the type of materials used.

An improvement of the circuit shown in FIGURE 10 comprises providing a voltage supply of a magnitude insufficient to heat the thermochromic-electrothermal elements to their critical temperatures. A second supply of external heat is then provided with means to select which device the external heat is applied to. Only when the voltage supply and the external source of heat are simultaneously applied to a device reach its self-heating mode in order to provide a change of color and a register output. Alternatively, two voltage pulses may be selectively applied to a device, the device reaching its self-heating mode only when both pulses are simultaneously applied.

FIGURE 9 is a diagrammatic illustration of a physical embodiment of the circuit shown in FIGURE 10. A metallized contact strip 168 is laid upon a suitable substrate and interconnects like terminals of three thermochromic-electrothermal devices 170, 172 and 174. These devices are constructed from PTCA type material. A second metallized contact strip 176 is provided on the substrate and connects like terminals of three thermochromic-electrothermal devices 178, 180 and 182, each constructed from NTCA material.

The remaining terminal of the device 170 is connected to the terminal of a start switch 184, the other switch terminal of which is connected to a resistor 186. A voltage supply is applied across the metallized contact strips 168 and 176. A metallized contact strip 188 connects the elements 172 and 178, and also provides an Output 1. A metallized contact strip 190 connects the elements 174 and 180 and provides an Output 2. Insulating material 192 electrically insulates the devices from one another, but allows close thermal coupling of the adjacently disposed PTCA and NTCA thermochromic-electrothermal devices to provide an operation as previously described with respect to FIGURE 10.

Figure 11:
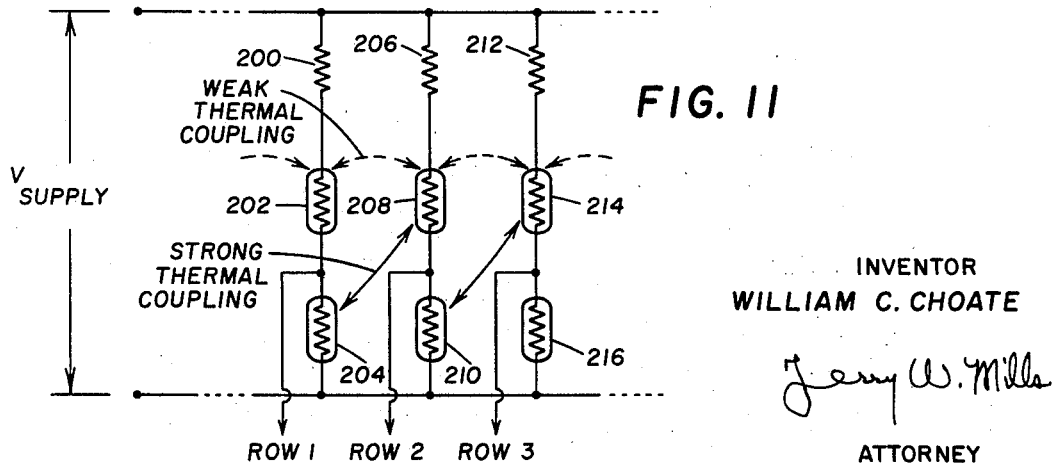
FIGURE 11 is a schematic diagram of a stable shift register constructed in accordance with the invention.

FIGURE 11 illustrates a stable shift register utilizing the present thermochromic-electrothermal devices. This register is useful for scanning rows of the previously described arrays. A voltage supply is applied across the terminals of a series circuit comprising a resistor 200, and two identical PTCA thermochromic-electrothermal devices 202 and 204. A lead connected between devices 202 and 204 provides an output designated as Row 1. A similar circuit comprising a resistor 206, and two series connected PTCA thermochromic-electrothermal devices 208 and 210 is also connected across the voltage supply. An output taken from between the devices 208 and 210 provides an output designated as Row 2. Similarly, a circuit containing a resistor 212 and a pair of identical PTCA thermochromic-electrothermal devices 214 and 216 are connected across the voltage supply as a third stage to provide an output designated generally as Row 3. It will be understood that additional rows may be provided to provide the desired capacity for the register.

Devices 202, 208 and 214 are physically disposed such that there is relatively weak thermal coupling between adjacent ones of the devices. However, devices 204 and 208 are placed relatively close together so that there is strong thermal coupling therebetween. Similarly, the devices 210 and 214 are relatively closely spaced together so that strong thermal coupling exists therebetween. The devices 204, 210 and 216 are so constructed that they are not forced into the self-heating mode during the operation of the register. The weak thermal coupling between the devices is such that when one of the devices is hot, the other device will be warm, but not hot enough to self-heat. The strong thermal coupling is such that when one of the two coupled devices is hot, the other device will be hot and self-heating.

In operation of the register, devices 202 and 204 are both warm, but are not hot enough to be placed in the self-heating mode. A voltage overcharge in the form of a synchronizing pulse is imposed on the voltage supply and the device 202 is heated sufficiently to be placed in the self-heating mode. An output thus occurs upon the lead designated as Row 1, and device 202 changes color. Due to the weak thermal coupling between the devices 202 and 208, the device 208 is warm, but is not hot enough to be placed in a self-heating mode until the next synchronizing voltage pulse occurs. This next occurrence of excess voltage is sufficient to place the device 208 in the self-heating mode to provide an output on Row 2 and to provide a color change. Due to the strong thermal coupling between the device 208 and device 204, the device 204 is heated sufficiently that the current through the device 202 is limited below that required to sustain the device 202 in the self-heating mode. Device 202 is then cooled and the output on the lead designated as Row 1 is extinguished.

When the device 202 is placed in the self-heating mode, the device 214 is warmed sufficiently that upon the occurrence of the next synchronizing pulse, the device 214 is placed in the self-heating mode. As previously described, the strong thermal coupling between the device 214 and the device 210 heats the device 210 to raise the resistance of the device. The current flow through the device 208 is thus reduced to a point where the device 208 is cooled below its self-heating mode and the output on the lead designated as Row 2 is extinguished. The register shown in FIGURE 11 provides a scan output only upon the occurrence of each successive synchronizing pulse.

The devices shown in FIGURES 3 and 8 may also be employed as input memory devices. In this instance, the circuit is operated by placing each of the devices in the circuit in the self-heating mode, as by a large overvoltage supplied to the voltage supply. If one of the devices is then contacted by a heat sink, as by the finger of the operator, sufficient heat is extracted from the device to reset it to its cold mode. A temperature sensitive resistor disposed below the element in a manner similar to that shown in FIGURE 3 senses the reduction in the temperature of the device. Alternatively, the voltage across the PTCA elements of FIGURE 8 can be monitored to establish the states of the elements. The state of each and every device in the array can then be continuously determined by the outputs of the heat sensitive devices, or may be read in a time-multiplexed basis utilizing the scanning circuit shown in FIGURES 9 and 10. The circuit hence provides electrical and graphic memory of the heat sink input.

Whereas the present invention has been described with respect to specific embodiments thereof, it has been understood that various changes and modifications will be suggested to one skilled in the art, and such changes and modifications are desired to be encompassed by the appended claims.

What is claimed is:

1. A device having two stable color states comprising:
   (a) structure including material having thermochromic characteristics and having an electrical resistance which varies in a known manner in dependence upon temperature,
   (b) a source of electric voltage for said structure, and
   (c) means selectively operable for varying the temperature of said structure to cause a change of color of said structure due to said thermochromic characteristics and to cause a variation of the resistance of said structure such that said change of color is maintained after termination of the operation of said means.

2. The device of claim 1 wherein said structure comprises a first body having thermochromic characteristics and a second body in thermal contact with said first body having an electrical resistance which varies in dependence upon temperature.

3. The device of claim 1 wherein said structure comprises a single material having thermochromic characteristics and having an electrical resistance variable in dependence upon temperature.

4. The device of claim 1 wherein said structure comprises positive temperature coefficient anomaly material, said change of color being maintained until said source of electrical voltage is removed from said structure.

5. The device of claim 1 wherein said means for selectively varying the temperature of said structure comprises a laser beam impinging on said structure.

6. The device of claim 1 wherein said means for selectively varying the temperature of said structure comprises means for changing the magnitude of electrical current flowing through said structure.

7. The device of claim 1 wherein said means for selectively varying the temperature of said structure comprises a heating source in thermal contact with said structure.

8. The device of claim 1 wherein said means for selectively varying the temperature of said structure comprises a heat sink for removal of heat.

9. The device of claim 1 wherein said device additionally has two stable voltage states to provide a bistable voltage memory.

10. A circuit having bistable color states comprising:
    (a) a pair of series connected devices each having thermochromic characteristics and also having electrical resistances which vary in dependence upon temperature,
    (b) a source of voltage for application across said devices, and (c) means for selectively varying the resistances of said devices to cause opposite color changes of said devices.

11. The circuit of claim 10 and comprising means for selectively providing an electrical short across one of said devices to cause heating of the other of said devices.

12. The circuit of claim 10 wherein said means comprises a laser beam for selectively heating one of said devices to vary the resistance of said devices.

13. The circuit of claim 10 wherein each of said devices comprises a first body of material having thermochromic characteristics and a second body of material having an electrical resistance which varies with temperature.

14. The circuit of claim 10 wherein each of said devices comprises a single material having both thermochromic characteristics and electrical resistances which vary with temperature.

15. The circuit of claim 10 and further comprising an array of similar devices with means for selectively varying the colors of said devices in a manner so as to provide a meaningful display of intelligence on said array.

16. The array of claim 10 and further comprising a laser beam operable by modulation and deflection circuitry to selectively change the colors of said devices to display intelligence thereon.

17. The circuit of claim 10 and further comprising an array of pairs of said series connected devices, ones of said devices being thermally coupled with one another.

18. A circuit having various states comprising:
 (a) a plurality of parallel pairs of series connected devices each having thermochromic and electrothermal properties, at least one device of each pair being thermally coupled with at least one device of another pair,
 (b) a source of voltage for said devices, and
 (c) means for varying the temperature of said devices.

19. The circuit defined in claim 18 wherein a first device of each pair is in strong thermal contact with one device in an adjacent pair, and the second device of each pair is in weak thermal contact with another device in an adjacent pair.

20. The circuit defined in claim 18 wherein said means comprises a source of synchronizing voltage pulses.

21. The circuit defined in claim 18 wherein said means comprises a heat sink for the removal of heat from said devices.

22. The method for varying the color of material having thermochromic and electrothermal properties comprising:
 (a) applying an electric potential across the material, and
 (b) heating said material to cause a thermochromic color change and to cause an electrical resistance change sufficient to maintain the material in a self-heating mode even after the termination of said heating.

23. The method of claim 22 and further comprising: removing said electric potential from said material to cause a color change due to cooling of said material.

References Cited

UNITED STATES PATENTS

| | | | |
|---|---|---|---|
| 3,210,876 | 10/1965 | Towne | 40—130 |
| 3,256,518 | 6/1966 | Crane | 350—160 |
| 3,323,241 | 6/1967 | Blair et al. | 40—28 |
| 3,354,565 | 11/1967 | Emmons et al. | 40—28 |

EUGENE R. CAPOZIO, Primary Examiner

WENCESLAO J. CONTRERAS, Assistant Examiner